UNITED STATES PATENT OFFICE.

FRANK W. GIBSON, OF LAKEPORT, CALIFORNIA.

PROCESS OF DRYING FRUIT.

SPECIFICATION forming part of Letters Patent No. 539,258, dated May 14, 1895.

Application filed January 9, 1895. Serial No. 534,401. (No specimens.)

*To all whom it may concern:*

Be it known that I, FRANK W. GIBSON, a citizen of the United States, residing at Lakeport, Lake county, State of California, have invented an Improvement in the Process of Preparing Prunes, Plums, and other Fruit for Drying; and I hereby declare the following to be a full, clear, and exact description of the same.

My invention relates to the art of preparing prunes, plums and other fruit for drying, in which one of the essential steps is what is known as "checking" them, by which is meant the breaking of their skins in order that they may dry properly. This step in the process is also commonly known as "dipping" for the reason that up to a recent period it has been the invariable practice to dip the fruit into a hot solution of lye. Of late years, however, another practice has been resorted to, namely, that of pricking the skins of the fruit mechanically. Both these methods have their objections, but the pricking process has not as yet found much favor, and the usual course is to dip the fruit in lye. This successfully breaks the skin, but on account of the lye, itself, being harmful, it is necessary, and it is the practice to thoroughly wash the prunes, generally in cold water, for the sake of convenience after they have been dipped.

The object of my invention is to provide in the process, a dipping which shall be not only of a perfectly harmless nature, but, on the contrary, shall tend toward a beneficial result in the subsequent consumption of the fruit, and one also which shall avoid the necessity and the consequent time and trouble of subsequently washing off the dipping solution, and thereby, as a result, hastening the final drying process because of the fact that my fruit is subjected to the drying process, while in the ordinary process it is placed out cold after being dipped into the washing water. This essential step of my invention consists in dipping the fruit into a hot solution of a carbonate of soda, either the carbonate, itself, or preferably the bi-carbonate of soda. My process consists in first dipping the fruit into a hot or boiling solution of one of the carbonates of soda, and then in subsequently exposing the dipped fruit to a drying medium. It also consists in dipping the fruit, as described, and then in exposing it without any intermediate washing to the drying medium.

In carrying out my process I first make a solution of a carbonate of soda in water. This salt of soda may be either the bi-carbonate or the carbonate, itself, though preferably the bi-carbonate. I do not confine myself to any particular strength of this solution, though I have found, in practice, and, therefore, herein state it as a good formula, that three or four ounces of the bi-carbonate of soda to one gallon of water will answer the purpose and produce satisfactory results. This solution I raise to the boiling point and while boiling I dip the fruit into it and let it stay in a little longer than is usual with the lye solution. For example, it is customary, in dipping the fruit into a lye solution, to let it remain in while you count twenty, but I have found in practice, that in a weak solution of the salt of soda, above mentioned, the fruit should be allowed to remain in while you count forty. Upon taking the fruit out of this solution, it will be found that the skins are perfectly checked and broken, and they may be now, if desired, washed off, but as I have above pointed out, it is better to put them out into the air or other place where they are to be dried (in a drier if artificial heat is to be used) directly and without any intermediate washing. By the use of this soda solution, no harmful results can take place as from the lye solution. If anything, the presence of the soda upon the fruit will be beneficial to the stomach so that by allowing it to remain on the fruit any subsequent washing is avoided and thus time and labor saved, and at the same time the fruit is put out hot, thereby accelerating its drying and completing the process in a much less length of time.

Having thus described my invention, what I claim as new, and desire to secure by Letters Patent, is—

1. The process of preparing fruit for drying which consists in first dipping it into a hot solution of the bi-carbonate of soda, and then before cooling, drying the same.

2. The process of preparing fruit for drying which consists in first dipping it into a hot solution of the bicarbonate of soda and then, before cooling, finally drying it by exposing it to the action of heat.

In witness whereof I have hereunto set my hand.

FRANK W. GIBSON.

Witnesses:
S. H. NOURSE,
H. F. ASCHECK.